Sept. 20, 1949.   L. H. STITES   2,482,641
STEERING WHEEL SPINNER
Filed Sept. 18, 1947
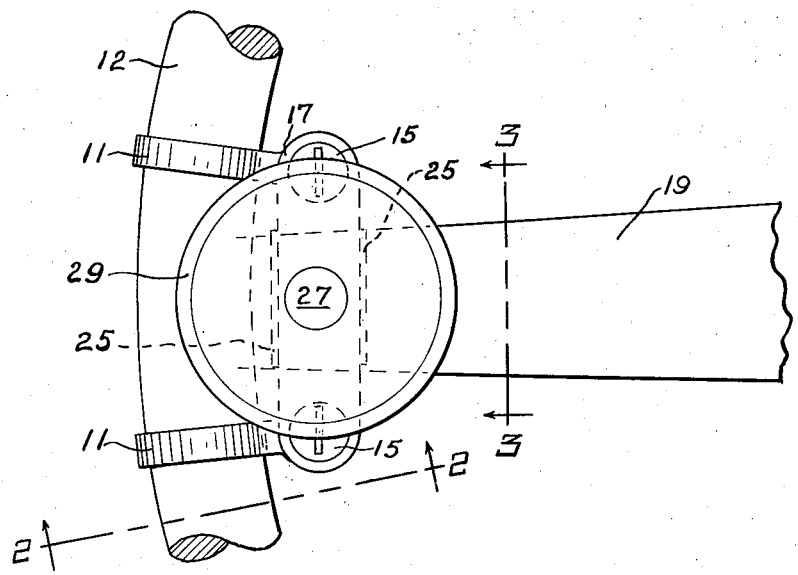
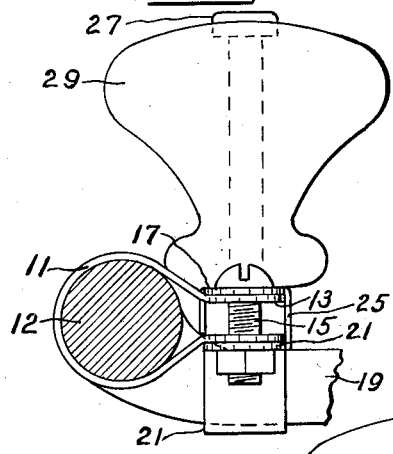
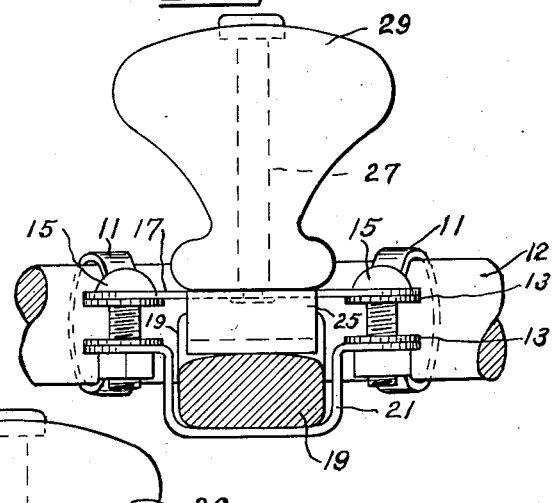
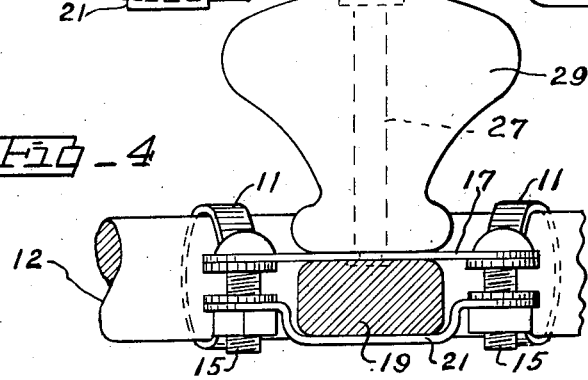
INVENTOR
*LOREN H. STITES*
BY
*F. D. Hicks*
ATTORNEY Patented Sept. 20, 1949

2,482,641

UNITED STATES PATENT OFFICE 2,482,641

STEERING WHEEL SPINNER

Loren H. Stites, Flint, Mich.

Application September 18, 1947, Serial No. 774,702

4 Claims. (Cl. 74—557)

This invention pertains to steering knobs or spinners to be conveniently applied on the steering wheel of any type of motor vehicle, so that steering may be accomplished by one hand while leaving the other hand free to give signals, release or apply the hand brake, or shift gears.

It is an object of the invention to provide a steering wheel spinner of an improved durable and rugged construction and which may be conveniently applied upon a steering wheel without altering the construction of the wheel.

It is also an object of the invention to provide an improved steering wheel spinner having mounting means which clamps the knob over a spoke of the steering wheel so that the knob is inside of the rim.

It is a further object of the invention to provide such a steering wheel spinner which is held from turning or sliding on the spoke of the steering wheel by two narrow bands around the rim.

Another object of the invention is to provide a steering wheel spinner which may be conveniently mounted upon a steering wheel in which the spokes are offset and disposed below the plane of the axis of the rim.

Further objects and advantages are within the scope of my invention, such as relate to the arrangement, operation and function of the related elements of the structure, to various details of construction and to combinations of parts, elements per se, and to economies of manufacture and numerous other features as will be apparent from a consideration of the specification in conjunction with the drawing disclosing specific embodiments of the invention, in which:

Fig. 1 is a plan view showing the steering wheel of an automobile having one of the improved spinners mounted thereon;

Fig. 2 is a sectional view on line 2—2 in Fig. 1;

Fig. 3 is a sectional view taken on line 3—3 in Fig. 1; and

Fig. 4 is a view similar to Fig. 3 and showing a different embodiment for steering wheels wherein the spokes do not have so much offset.

Referring more specifically to Figs. 1 through 3 of the drawing, I have illustratively disclosed an embodiment of my invention comprising a pair of clamp bands or rings 11 which are openable at the innermost sides to be passed over and around the rim 12 of a steering wheel. The ends of these bands 11 are preferably bent to extend inwardly for providing clamping lugs 13 through which clamp bolts 15 are passed for snugly clamping these bands on the rim of the wheel.

An upper plate 17 is provided for extending over the spoke 19 of the steering wheel and a lower plate 21 is provided for extending under the spoke. The ends of these plates engage the upper and lower lugs of the clamping bands and are also there secured by the clamping bolts 15. When the bolts 15 are tightened, the upper and lower plates 17 and 21 are clamped snugly on the spoke 19 at the same time as the bands 11 are clamped on the rim 12 of the steering wheel. The intermediate portion of the lower plate 21 is offset or downset suitably to pass under the spoke and this deformation of the plate may be varied to suit different forms of steering wheels, as may be seen in Figs. 3 and 4. The upper plate 17 may be provided with tabs 25 turned down suitably for engaging the upper side of an offset steering wheel spoke, as may be seen in Fig. 3. When the spokes of the steering wheel are more nearly in alignment with the plane of the rim of the steering wheel, the tabs 25 may be omitted and the offset of the lower plate may be made less, as shown in Fig. 4.

A pivot pin 27 rotatively supports a knob 29 above the central portion of the upper plate 17. The lower end of this pivot pin 27 is reduced to pass through a suitable aperture in the upper plate, wherein it is peened for firm and permanent attachment.

The upper and lower plates, and the two clamping bands or ring, may be made of any suitable resilient metal and may be suitably plated to provide a noncorrosive surface of a pleasing appearance. The knob 29 may be made of wood or of various well known plastic composition materials having suitable strength and which are pleasing to the touch.

This arrangement clamps the knob over the spoke so that the knob is inside of the rim thereby allowing the operator full advantage of the rim for greater control and safety. There is room to provide a rather large knob. Also there is less danger of catching in the driver's clothing while steering.

It is apparent that within the scope of my invention modifications and different arrangements may be made other than herein disclosed, and the present disclosure is illustrative merely, the invention comprehending variations thereof.

What is claimed as the invention is:

1. A steering wheel spinner comprising, a pair of clamp bands having the inner sides openable with ends directed to be passed over the rim of a steering wheel spaced on opposite sides of a spoke of the wheel, a bottom plate extending between the inwardly directed ends of the two clamp bands for passing under a steering wheel spoke, an upper plate extending between the inwardly directed ends of the two clamp bands for passing over a steering wheel spoke, clamping bolts extending through the inwardly directed ends of the clamp bands and through the ends of said plates for drawing the bands snugly upon the rim of a wheel and also clamping the steering wheel spoke between said plates, a pivot pin secured in a central portion of said upper plate and rising therefrom, and a knob rotatively supported on said pivot pin above said upper plate.

2. A steering wheel spinner in accordance with claim 1 and further characterized by a portion of said lower plate being offset to pass under a steering wheel spoke and said upper plate extending straight over the steering wheel spoke.

3. A steering wheel spinner comprising, an upper plate for passing over a steering wheel spoke, a lower plate for passing under a steering wheel spoke, a pair of clamping bolts passing through the ends of said plates for clamping the plates over and under a steering wheel spoke, a pair of clamp bands adapted to be secured by the same bolts to be simultaneously clamped around the rim of a steering wheel in spaced relation on opposite sides of said steering wheel spoke, a knob, and means rotatively mounting said knob on the upper plate.

4. A steering wheel spinner in accordance with claim 3 and further characterized by a portion of said lower plate being offset to pass under a steering wheel spoke and said upper plate passing straight over the steering wheel spoke.

LOREN H. STITES.

REFERENCES CITED

The following references are of record in the file of this patent:

UNITED STATES PATENTS

| Number | Name | Date |
|---|---|---|
| 1,453,012 | Jackson | Apr. 24, 1922 |
| 1,620,223 | Norcross | Mar. 8, 1927 |
| 1,735,783 | Oliver | Nov. 12, 1929 |
| 1,784,230 | Freeman | Dec. 9, 1930 |
| 2,166,296 | Hoover | July 18, 1939 |
| 2,425,055 | Taylor | Aug. 5, 1947 |